(12) United States Patent
Watanabe et al.

(10) Patent No.: US 9,575,383 B2
(45) Date of Patent: Feb. 21, 2017

(54) LIQUID CRYSTAL DISPLAY DEVICE

(71) Applicant: Japan Display Inc., Minato-ku (JP)

(72) Inventors: Kazuhito Watanabe, Saitama-ken (JP); Masakatsu Kitani, Saitama-ken (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/155,535

(22) Filed: May 16, 2016

(65) Prior Publication Data

US 2016/0259221 A1    Sep. 8, 2016

Related U.S. Application Data

(63) Continuation of application No. 13/935,875, filed on Jul. 5, 2013, now Pat. No. 9,360,720.

(30) Foreign Application Priority Data

Jul. 23, 2012  (JP) ................................ 2012-162965

(51) Int. Cl.
*G02F 1/136* (2006.01)
*G02F 1/1362* (2006.01)
(Continued)

(52) U.S. Cl.
CPC ....... *G02F 1/136204* (2013.01); *G02F 1/1337* (2013.01); *G02F 1/1368* (2013.01);
(Continued)

(58) Field of Classification Search
CPC  G02F 1/1368; G02F 1/136227; G02F 1/1365; G02F 1/13624; G02F 2001/136281; G02F 1/136204; G02F 1/13306; G02F 1/133345; G02F 1/133512; G02F 1/133514; G02F 1/1337; G02F 1/134309; G02F 1/136286; G02F 2001/133302; G02F 2001/133519; G02F 2202/104
(Continued)

(56) References Cited

U.S. PATENT DOCUMENTS

2008/0170168 A1* 7/2008 Jung .................. G02F 1/13454
                                                    349/47
2011/0266544 A1  11/2011 Park et al.
2013/0140571 A1*  6/2013 Imai .................... H01L 33/0041
                                                    257/59

FOREIGN PATENT DOCUMENTS

JP   10-268348 A   10/1998
JP   11-135796 A    5/1999
(Continued)

OTHER PUBLICATIONS

Office Action issued Feb. 2, 2016 in Japanese Patent Application No. 2012-162965 (with English translation).

*Primary Examiner* — Nathanael R Briggs
*Assistant Examiner* — William Peterson
(74) *Attorney, Agent, or Firm* — Oblon, McClelland, Maier & Neustadt, L.L.P.

(57) ABSTRACT

A first semiconductor layer is formed in the shape of an island in an active area displaying images on an array substrate. A second semiconductor layer is formed in the shape of an island outside the active area. A first insulating film covers the first and second semiconductor layers. A gate line is formed on the first insulating film and extends in a first direction. The gate line includes a gate electrode crossing the first semiconductor layer and a crossing portion crossing the second semiconductor layer. A second insulating film covers the gate line. A source line is formed on the second insulating film and extends in a second direction. The source line includes a source electrode contacting with the (Continued)

first semiconductor layer. A drain electrode is formed on the second insulating film apart from the source line and contacting with the first semiconductor layer.

15 Claims, 9 Drawing Sheets

(51) Int. Cl.
*G02F 1/1368* (2006.01)
*G02F 1/133* (2006.01)
*G02F 1/1333* (2006.01)
*G02F 1/1335* (2006.01)
*G02F 1/1337* (2006.01)
*G02F 1/1343* (2006.01)

(52) U.S. Cl.
CPC .... *G02F 1/13306* (2013.01); *G02F 1/133345* (2013.01); *G02F 1/133512* (2013.01); *G02F 1/133514* (2013.01); *G02F 1/134309* (2013.01); *G02F 1/136227* (2013.01); *G02F 1/136286* (2013.01); *G02F 2001/133302* (2013.01); *G02F 2001/133519* (2013.01); *G02F 2202/104* (2013.01)

(58) Field of Classification Search
USPC .......................................................... 349/43
See application file for complete search history.

(56) References Cited

FOREIGN PATENT DOCUMENTS

| | | |
|---|---|---|
| JP | 2005-64338 | 3/2005 |
| JP | 2012-108315 A | 6/2012 |
| JP | 2013-083679 A | 5/2013 |

\* cited by examiner

LIQUID CRYSTAL DISPLAY DEVICE

CROSS-REFERENCE TO RELATED APPLICATIONS

This application is continuation of and is based upon and claims the benefit of priority under 35 U.S.C. §120 for U.S. Ser. No. 13/935,875, filed Jul. 5, 2013 and claims the benefit of priority from prior Japanese Patent Application No. 2012-162965 filed Jul. 23, 2012, the entire contents of which are incorporated herein by reference.

FIELD

Embodiments described herein relate generally to a liquid crystal display device.

BACKGROUND

A liquid crystal display device is used in various fields of OA equipments such as a personal computer and a television set, taking advantage of the features such as light weight, thin shape, and low power consumption. In recent years, the liquid crystal display device is used also as displays for a portable remote terminal such as a cellular phone and PDA (personal digital assistant), a car navigation equipment, and a game machine.

In the process for manufacturing the liquid crystal display device, the measure against electrostatic is indispensable. For example, there is a possibility that various wirings in an active area, a switching element, etc., are damaged with static electricity generated in the manufacturing process, or invaded from outside. The technique for improving tolerance over such static electricity is examined variously.

For example, a structure equipped with a dummy poly-silicon semiconductor layer in each pixel is proposed different from the poly-silicon semiconductor layer constituting a thin film transistor. A gate electrode line overlaps with the poly-silicon semiconductor layer and the dummy poly-silicon semiconductor layer through a gate insulating film. In such structure, a process until forming the gate electrode line is conducted under following conditions. That is, when a substrate is placed on a table, capacitance formed between the poly-silicon semiconductor layer and the table is set to Ca, capacitance formed between the poly-silicon semiconductor layer and the gate electrode line through the gate insulating film is set to Cb, capacitance formed between the dummy poly-silicon semiconductor layer and the table is set to Cc, capacitance formed between the dummy poly-silicon semiconductor layer and the gate electrode line through the gate insulating film is set to Cd, the dummy poly-silicon semiconductor layer is formed to satisfy an equation: $Ca/(Ca+Cb)<Cc/(Cc+Cd)$. According to the above structure, a voltage impressed to the gate insulating film between the dummy poly-silicon semiconductor layer and the gate electrode line becomes larger rather than the voltage impressed to the gate insulating film between the poly-silicon semiconductor layer and the gate electrode line. For this reason, even if it is a case where electric charges are accumulated to the extent that electrostatic discharge destruction takes place in the gate insulating film between the poly-silicon semiconductor layer and the gate electrode line, and between the dummy poly-silicon semiconductor layer and the gate electrode line, breakdown of the gate insulating film between the dummy poly-silicon semiconductor layer and the gate electrode line generates preferentially, and the thin film transistor equipped with the poly-silicon semiconductor layer is protected.

By the way, in the recent liquid crystal display device, requests for a high definition display and a high aperture ratio has been increasing. Accordingly, it becomes difficult to keep a space to arrange the dummy poly-silicon semiconductor layer in each pixel.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

Figure 1:
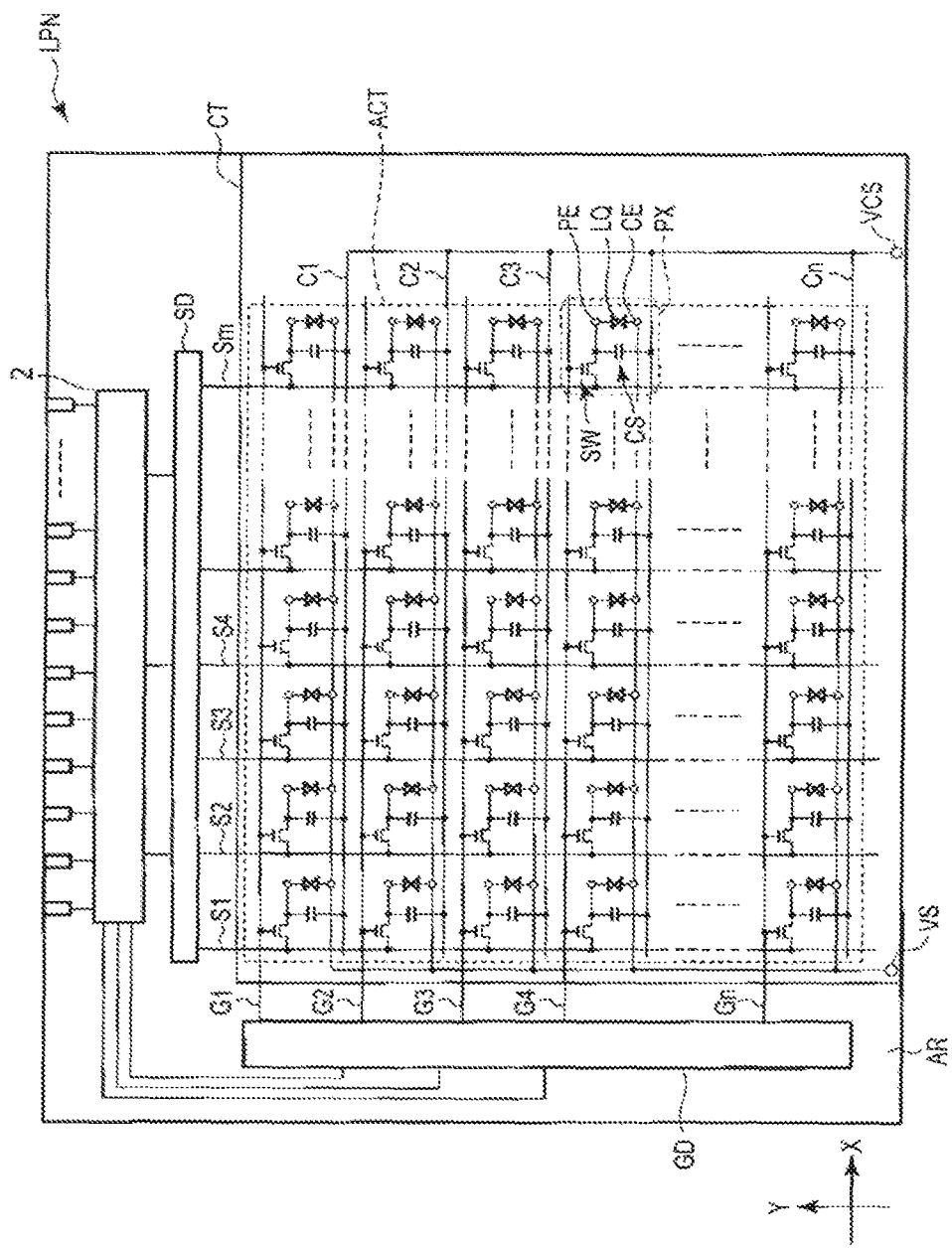
FIG. 1 is a view schematically showing a structure of a liquid crystal display panel and its equivalent circuit according to one embodiment.

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device includes: a first substrate including; a first semiconductor layer formed in the shape of an island in an active area displaying images, a second semiconductor layer formed in the shape of an island outside the active area, a first insulating film covering the first and second semiconductor layers, a gate line formed on the first insulating film and extending in a first direction, the gate line including a gate electrode crossing the first semiconductor layer and a crossing portion crossing the second semiconductor layer, a second insulating film covering the gate line, a source line formed on the second insulating film and extending in a second direction orthogonally crossing the first direction, the source line including a source electrode contacting with the first semiconductor layer, a drain electrode formed on the second insulating film apart from the source line and contacting with the first semiconductor layer, and a pixel electrode electrically connected with the drain electrode; a second substrate arranged facing the first substrate; and a liquid crystal layer held between the first substrate and the second substrate.

FIG. 1 is a view schematically showing a structure of a liquid crystal display panel LPN and its equivalent circuit according to one embodiment.

The liquid crystal display device includes an active-matrix type liquid crystal display panel LPN. The liquid crystal display panel LPN is equipped with an array substrate AR as a first substrate, a counter substrates CT as a second substrate arranged opposing the array substrate AR, and a liquid crystal layer held between the array substrate AR and the counter substrate CT. The liquid crystal display panel LPN includes an active area ACT which displays images. The active area ACT is constituted by a plurality of pixels PX arranged in the shape of a (m>n) matrix (here, "m" and "n" are positive integers).

The array substrate AR includes a plurality of gate lines G (G1-Gn) and auxiliary capacitance lines C (C1-Cn) extending along a first direction X in the active area ACT, respectively, source lines S (S1-Sm) extending along a second direction Y that orthogonally crosses in the first direction X, respectively, a pixel electrode PE electrically connected with a switching element SW in each pixel PX, and a common electrode CE facing the pixel electrode PE each other through a liquid crystal layer LQ in each pixel PX.

The pixel electrode PE is formed in an island shape in each pixel. The common electrode CE is formed in common over a plurality of pixels PX Each gate line G is pulled out to outside of the active area ACT and connected to a gate driver GD. Each source line S is pulled out to the outside of the active area ACT and connected to a source driver SD. Each auxiliary capacitance line C is pulled out to the outside of the active area ACT and electrically connected with a voltage impression portion VCS to which auxiliary capacitance voltage is supplied. The common electrode CE is electrically connected with an electric supply portion VS to which common voltage is supplied. At least a portion of the gate driver GD and the source driver SD is formed in the array substrate AR, for example, and the gate driver GD and the source driver SD are connected with the driver IC chip 2 provided in the array substrate AR and having an implemented controller. In the illustrated example, the drive IC chip 2 as a signal source required to drive the liquid crystal display panel LPN is mounted on the array substrate AR outside of the active area ACT of the liquid crystal display panel LPN.

The liquid crystal display panel LPN according to the embodiment is constituted so that modes mainly using a vertical mode such as a TN (Twisted Nematic) mode, an OCB (Optically Compensated Bend) mode, and a VA (Vertical Aligned) mode, and modes mainly using lateral electric field such as IPS (In-Plane Switching) mode and FFS (Fringe Field Switching) mode, are applied. For example, in the mode using the vertical electric field, while the array substrate AR is equipped with the pixel electrode PE, the counter substrate CT is equipped with the common electrode CE. Moreover, the array substrate AR is equipped with the both of the pixel electrode PE and the common electrode CE in the mode using the lateral electric field.

Hereinafter, the structure of the liquid crystal display panel LPN using the FFS mode is explained as an example.

Figure 2:
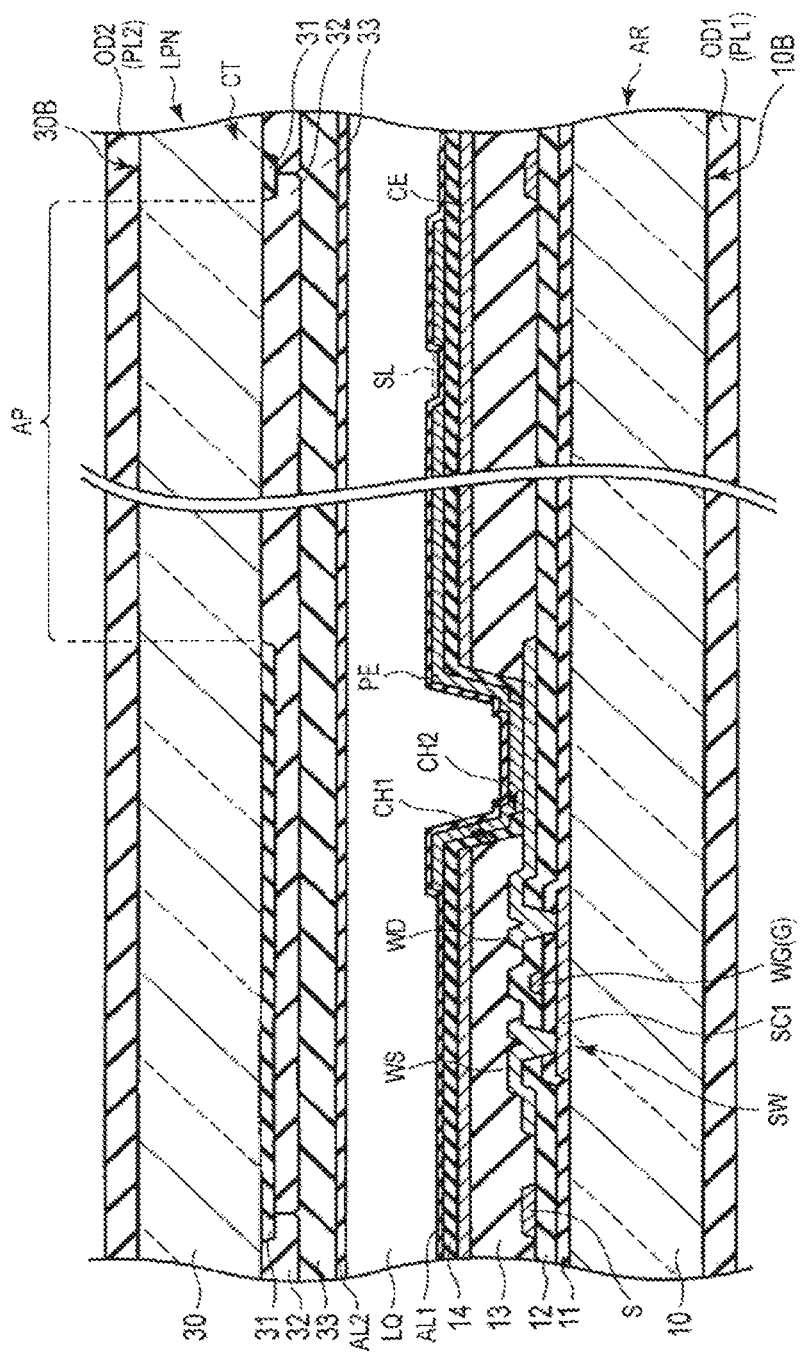
FIG. 2 is a cross-sectional view schematically showing the structure of the liquid crystal display panel shown in FIG. 1 including a switching element in one pixel.

FIG. 2 is a cross-sectional view schematically showing the structure of the liquid crystal display panel LPN shown in FIG. 1 including the switching element SW in one pixel.

The array substrate AR is formed using a first insulating substrate 10 formed of a glass substrate, etc., which has transmissive characteristics. This array substrate AR includes a switching element SW, a common electrode CE, a pixel electrode PE, a first insulating film 11, a second insulating film 12, a third insulating film 13, a fourth insulating film 14, and a first alignment film ALL etc., facing the counter substrate CT of the first insulating substrate 10.

The switching element SW shown here is a thin film transistor (TFT), for example. Although the switching element SW may be either of a top-gated type or a bottom gated-type, the top-gated type is used in this embodiment.

The switching element SW is equipped with a semiconductor layer SC1 arranged on the first insulating substrate 10. The semiconductor layer SC1 is formed with poly-silicon, for example. In addition, an undercoat layer formed of an insulating film may be arranged between the first insulating substrate 10 and the semiconductor layer SC1. The semiconductor layer SC1 is covered with the first insulating film 11. Moreover, the first insulating film 11 is arranged also on the first insulating substrate 10.

A gate electrode WG of the switching element SW is formed on the first insulating film 11 and located right above the semiconductor layer SC1. The gate electrode WG is a portion of the gate line G. The gate line G including the gate electrode WG is covered with the second insulating film 12. Moreover, the second insulating film 12 is arranged also on the first insulating film 11.

A source electrode WS and a drain electrode WD of the switching element SW, and a source line S are formed on the second insulating film 12. The source electrode WS is a portion of the source line S. The drain electrode WD is apart from the source line S. The source electrode WS and the drain electrode WD are in contact with the semiconductor layer SC1 through a contact hole which penetrates the first insulating film 11 and the second insulating film 12, respectively. The source line S including the source electrode WS and the drain electrode WD are covered with the third insulating film 13. The third insulating film 13 is arranged also on the second insulating film 12. A first contact hole CH1 which penetrates to the drain electrode WD is formed in the third insulating film 13.

The common electrode CE is formed on the third insulating film 13. In addition, the common electrode CE does not extend to the first contact hole CH1 formed in the third insulating film 13. The common electrode CE is formed by transparent electric conductive material, for example, Indium Tin Oxide (ITO), Indium Zinc Oxide (IZO), etc. The fourth insulating film 14 is arranged on the common electrode CE. A second contact hole CH2 penetrating to the drain electrode WD is formed in the fourth insulating film 14.

The pixel electrode PE is formed on the fourth insulating film 14, and faces the common electrode CE. More specifically, the pixel electrode PE is electrically connected with the drain electrode WD of the switching element SW through first contact hole CH1 and the second contact hole CH2. The pixel electrode PE is formed by transparent electric conductive material, for example, ITO, IZO, etc. Slits SL which counter the common electrode CE are formed in the pixel electrode PE. The pixel electrode PE is covered with the first alignment film AL1.

On the other hand, the counter substrate CT is formed using a second insulating substrate 30 such as a glass substrate, etc., which has transmissive characteristics. The counter substrate CT includes a black matrix 31, a color filter 32, an overcoat layer 33, and a second alignment film AL2, etc., on the second insulating substrate 30 facing the array substrate AR.

The black matrix 31 defines each pixel PX forming apertures AP, and counters wiring portions, such as the gate line G, the source line S, and also the switching element SW formed in the array substrate AR. The color filter 32 is formed in the aperture AP and extends to the black matrix 31. The overcoat layer 33 covers the color filter 32. The overcoat layer 33 makes flat unevenness of the surface of the Mack matrix 31 and the color filter 32. The surface of the overcoat layer 33 is covered with the second alignment film AL2.

The array substrate AR and the counter substrate CT as mentioned above are arranged so that respective first alignment film AM and second alignment film AL2 face each other. At this time, a predetermined cell gap is integrally formed with the pillar-shaped spacer formed in one substrate between the array substrate AR and the counter substrate CT. The array substrate AR and the counter substrate CT are pasted together by seal material so as to form a cell gap. The liquid crystal layer LQ is constituted by liquid crystal composite containing liquid crystal molecules enclosed with the cell gap formed between the first alignment film AM on the array substrate AR, and the second alignment film AL2 on the counter substrate CT.

A first optical element OD1 having a first polarization plate PL1 is arranged on the external surface 10B of the array substrate AR, i.e., the external surface of the first insulating substrate 10. Moreover, a second optical element OD2 having a second polarization plate PL2 is arranged on the external surface 30B of the counter substrate CT, i.e., an external surface of the second insulating substrate 30.

Here, the gate line G pulled out from the active area ACT and connected to the gate driver GD is explained more concretely.

Figure 3:
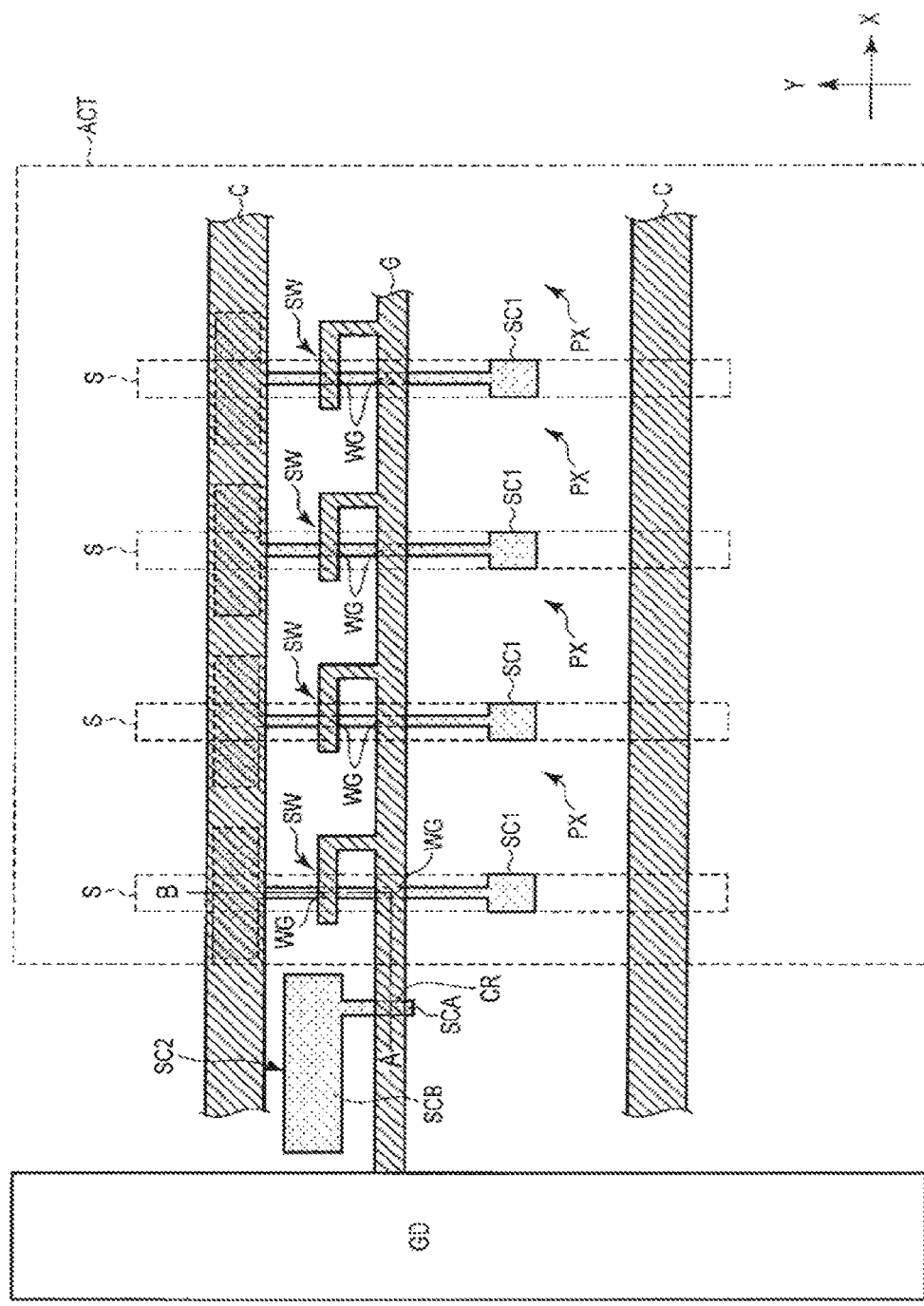
FIG. 3 is a view showing a layout of a gate line and a semiconductor layer SC2 crossing the gate line on an array substrate shown in FIG. 2.

FIG. 3 is a view showing a layout of the gate line G and the semiconductor layer SC2 crossing the gate line G on the array substrate AR shown in FIG. 2. In addition, only structures required for explanation are illustrated here focusing on the gate line G located between two adjoining auxiliary capacitance lines C.

The semiconductor layer SC1 is arranged in the active area ACT corresponding to the switching element SW of each pixel PX. Each of the semiconductor layer SC1 is formed in the shape of an island. The semiconductor layer SC2 is arranged on the outside of the active area ACT. The semiconductor layer SC2 is apart from the semiconductor layer SC1 and formed in the shape of an island. The semiconductor layer SC2 is located between the gate driver GD arranged in the outside of the active area ACT and the active area ACT. The gate line G and the auxiliary capacitance line C extend along the first direction X, respectively. The auxiliary capacitance line C is arranged in a position which overlaps with a portion of each semiconductor layer SC1, and forms capacitance required for the display in each pixel PX. The gate line G includes the gate electrode WG in the position which intersects the semiconductor layer SC1 in the active area ACT. In this embodiment, the gate line G intersects the semiconductor layer SC1 which extends in the second direction Y at two portions in each switching element SW, and respective portions correspond to the gate electrodes WG. Moreover, the gate line G includes an intersection portion CR which intersects the semiconductor layer SC2 outside of the active area ACT.

In this embodiment, although the gate line G is directly connected to the gate driver GD, the gate line G may be electrically connected to the gate driver GD through an electric conductive layer of the same layer as the source line without being limited to above embodiment.

The semiconductor layer SC2 is explained more concretely. That is, the semiconductor layer SC2 is equipped with a narrow portion SCA which intersects the gate line G, and an expanding portion SCB connected with the narrow line portion SCA. The narrow portion SCA extends in the second direction Y so as to cross the gate line G linearly extending along the first direction X. The expanding portion SCB is arranged in an oblong space extending in the first direction X between the gate line G and the auxiliary capacitance line C. The width of the expanding portion SCB is widened rather than the width of the narrow portion SCA. The area of the expanding portion SCB is larger than the area of the narrow portion SCA.

In addition, the source line S shown with a dashed line in the figure extends along the second direction Y. In the illustrated example, the source line S is arranged in a position which overlaps with the semiconductor layer SC1, and also overlaps with the gate electrode WG of the switching element SW.

Figure 4:
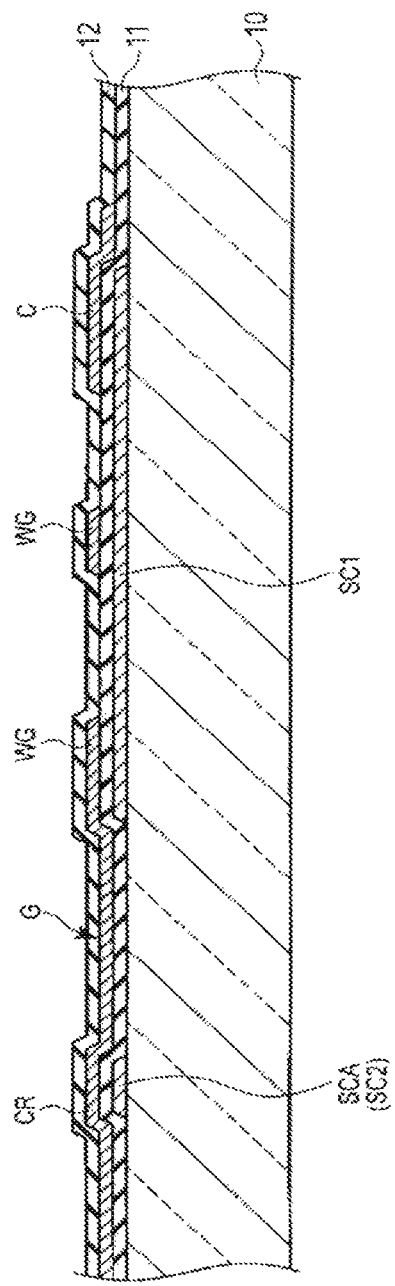
FIG. 4 is a cross-sectional view schematically showing the structure of the array substrate taken along line A-B shown in FIG. 3.

FIG. 4 is a cross-sectional view schematically showing the structure of the array substrate AR taken along line A-B shown in FIG. 3.

The semiconductor layer SC1 and the semiconductor layer SC2 are formed on the first insulating substrate 10, respectively, and covered with the first insulating film 11. That is, the semiconductor layer SC1 and the semiconductor layer SC2 are formed in the same layer. The semiconductor layer SC1 and the semiconductor layer SC2 are formed with the same material, for example, poly-silicon.

The gate line G including the crossing portion CR and the gate electrode WG is formed on the first insulating film 11, and covered with the second insulating film 12. The crossing portion CR counters with the narrow portion SCA of the semiconductor layer SC2 through the first insulating film 11. The gate electrode WG counters with the semiconductor layer SC1 through the first insulating film 11. The auxiliary capacitance line C is formed on the first insulating film 11, and covered with the second insulating film 12. The auxiliary capacitance line C counters with the semiconductor layer SC1 through the first insulating film 11. Although not illustrated, the source line and the drain electrode are formed on the second insulating film 12 as mentioned above.

The semiconductor layer SC2 explained in this embodiment functions as a dummy pattern for controlling electrostatic discharge destruction of the switching element SW. That is, the semiconductor layer SC2 guides the electric charges accumulated in the manufacturing process of the array substrate AR to outside of the active area ACT. Therefore, the semiconductor layer SC2 that is arranged in the outside of the active area prevents the switching element SW from the electrostatic discharge destruction. The mechanism is explained referring to a following model.

Figure 5:
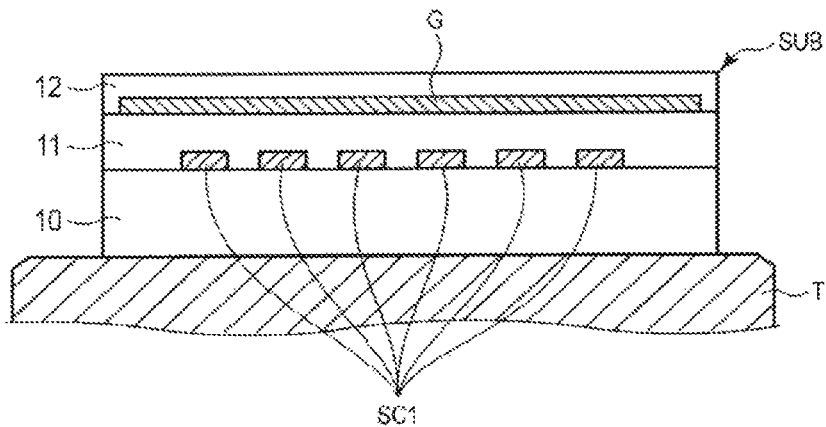
FIG. 5 is a view schematically showing a state in which a processed substrate with the gate line is placed on a support table.

FIG. 5 is a view schematically showing a state in which a processed substrate SUB with the gate line G is placed on a support table T.

The processed substrate SUB equipped with the semiconductor layer SC1, the first insulating film 11, the gate line G, and the second insulating film 12 on the first insulating substrate 10 are placed on the support table T whose whole surface is formed of a conductive material. Since electric charges flown in the gate line G are distributed with sufficient balance by substantially all of the semiconductor layers SC1 formed on the first insulating substrate 10, even if a voltage V is impressed to the gate line G due to the electric charges flown into the gate line G from the exterior, breakdown between the semiconductor layer SC1 and the gate line G is prevented.

Figure 6:
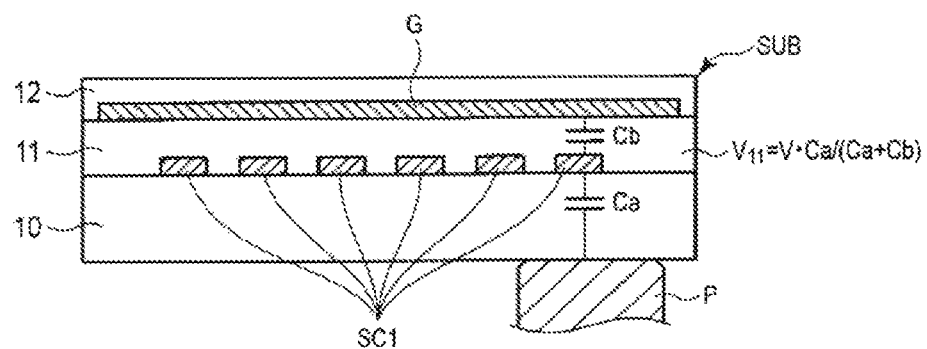
FIG. 6 is a view schematically showing a state in which a processed substrate with the gate line is supported by a support member.

FIG. 6 is a view schematically showing a state in which the processed substrate SUB with the gate line G is supported by a support member P.

In the manufacturing process of the array substrate AR, when transporting the processing substrate SUB, for example, in order to lift the processing substrate SUB, the processing substrate SUB may be supported by the support member P, such as a support pin. The contact surface between the support member P and the processing substrate SUB is much smaller than the contact surface between the support table T and the processing substrate SUB.

In such state, when the voltage V is impressed to the gate wiring G, the voltage V11 impressed to the first insulating film 11 is distributed according to capacitance distribution shown in Ca/(Ca+Cb). Here, Ca is a parasitic capacitance formed between the semiconductor layer SC1 and the support member P, and Cb is a crossing capacitance formed between the semiconductor layer SC1 and the gate wiring G through the first insulating film 11. That is, the electric charges flown into the processing substrate SUB concentrate to a region supported by the support member P. At this time, if the parasitic capacitance Ca in the region supported by the support member P becomes large, and the crossing capacitance Cb is small, potential difference between a portion of the semiconductor layers SC1 and the gate line G becomes large, and it becomes easy to generate the breakdown.

When the support member P supports the processing substrate SUB in a region corresponding to a central portion of the active area, the semiconductor layers SC1 are arranged corresponding to a plurality of pixels in the region supported by the support member, P. Accordingly, the electric charges flown into the gate line G are distributed with sufficient balance between the many semiconductor layers SC1 and the gate line G, and it is hard to generate the electrostatic discharge destruction.

However, when the support member P supports the processing substrate SUB in a region corresponding to a circumference portion of the active area, the semiconductor layers SC1 located in the region supported by the support member P are arranged corresponding to only the pixels located in the circumference in the active area. For this reason, the electric charges flown into the gate line G tend to concentrate between only a portion of the semiconductor layers SC1 and the gate line G, and to generate the electrostatic discharge destruction. That is, in the circumference portion of the active area, it is easy to generate display defect, such as a point defect, by abnormalities in the characteristic of the switching element or disconnection resulting from the electrostatic discharge destruction.

Figure 7:
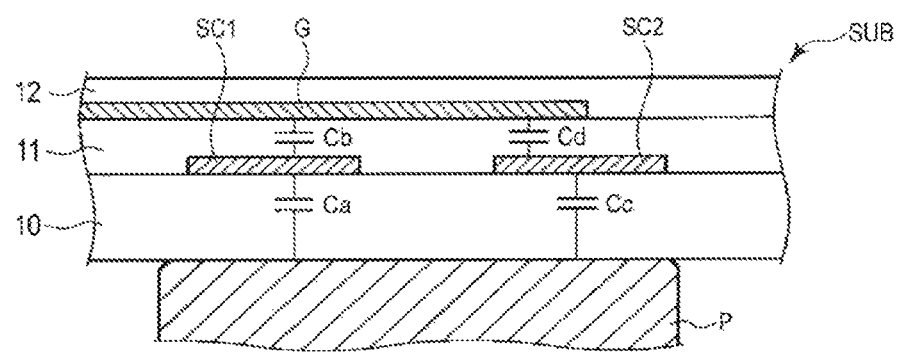
FIG. 7 is a view schematically showing a state in which a processed substrate having a semiconductor layer SC2 is supported by the support member according to the embodiment.

FIG. 7 is an enlarged view schematically showing a state in which the processed substrate SUB having the semiconductor layer SC2 is supported by the support member P according to this embodiment.

In this embodiment, the processing substrate SUB is equipped with a semiconductor layer SC2 as a dummy pattern outside of the active area.

When the support member P supports the processing substrate SUB in the region corresponding to the circumference portion of the active area in this embodiment, the semiconductor layer SC2 is arranged outside the active area other than the semiconductor layer SC1 arranged in the active area, in the region supported by the support member P. That is, in the region supported by the support member P, like the case where the support member P supports the processing substrate SUB in the region corresponding to the central portion of the active area, a plurality of semiconductor layers SC1 and semiconductor layers SC2 are arranged. Accordingly, the electric charges flown into the gate line G are distributed between semiconductor layer SC1 and the gate line G and between semiconductor layer SC2 and the gate line G, and it becomes possible to control generation of the electrostatic discharge destruction.

Moreover, if the parasitic capacitance is set to Cc formed between the semiconductor layer SC2 and the support member P, and the crossing capacitance formed between semiconductor layer SC2 and the gate line G through the first insulating film 11 is set to Cd as illustrated, when a voltage V is impressed to the gate line G, the voltage V11 impressed to the first insulating film 11 between the semiconductor layer SC2 and the gate line G is distributed according to a capacitance distribution ratio shown in Cc/(Cc+Cd).

At this time, the semiconductor layer SC2 is formed so that a relation of Ca/(Ca+Cb)<Cc/(Cc+Cd) may be satisfied. For example, the parasitic capacitance Cc outside the active area is set to be larger than the parasitic capacitance Ca in the active area, i.e., the formation area of the semiconductor layer SC2 is set to be larger than the formation area of the semiconductor layer SC1. Moreover, the crossing capacitance Cd outside the active area is set to be smaller than the crossing capacitance Cb in the active area, i.e., the crossing area of the semiconductor layer SC2 which counters with the crossing area CR of the gate line G is set to be smaller than the crossing area of the semiconductor layer SC1 which counters with the gate electrode WG. Anyway, it is important to satisfy the relation of the capacitance distribution ratio as described above.

When many electric charges flew into the gate line G, it becomes a state in which a high voltage V is impressed to the gate line G. In this case, the electric charges are guided to outside of the semiconductor layer SC2 formed so that the relation of the above-mentioned capacitance distribution ratio is satisfied, and the accumulated electric charges are consumed. That is, though electrostatic discharge destruction occurs, such electrostatic discharge destruction is generated out of the active area. Thereby, it becomes possible to control generation of the electrostatic discharge destruction in the active area, i.e., the generation of the electrostatic discharge destruction between the semiconductor layer SC1 and the gate line G.

Accordingly, it becomes possible to control disconnection or the generation of the abnormalities in the characteristic of the switching element, resulting from the electrostatic discharge destruction in the circumference in the active area, and it becomes possible to control generation of display defect such as the point defect, etc. Therefore, it becomes possible to control the decrease in the manufacturing yield resulting from the electrostatic discharge destruction.

The form of the semiconductor layer SC2 according to this embodiment is not limited to the form shown in FIG. 3. The semiconductor layer SC2 is arranged using a space in a position outside and near the active area. Furthermore, the form can be designed according to the form of the space. Hereinafter, other modifications of the form of the semiconductor layer SC2 are shown. In addition, other structures are the same as those shown in FIG. 3, and the same referential marks are attached to the same structures and detailed explanation thereof is omitted.

Figure 8:
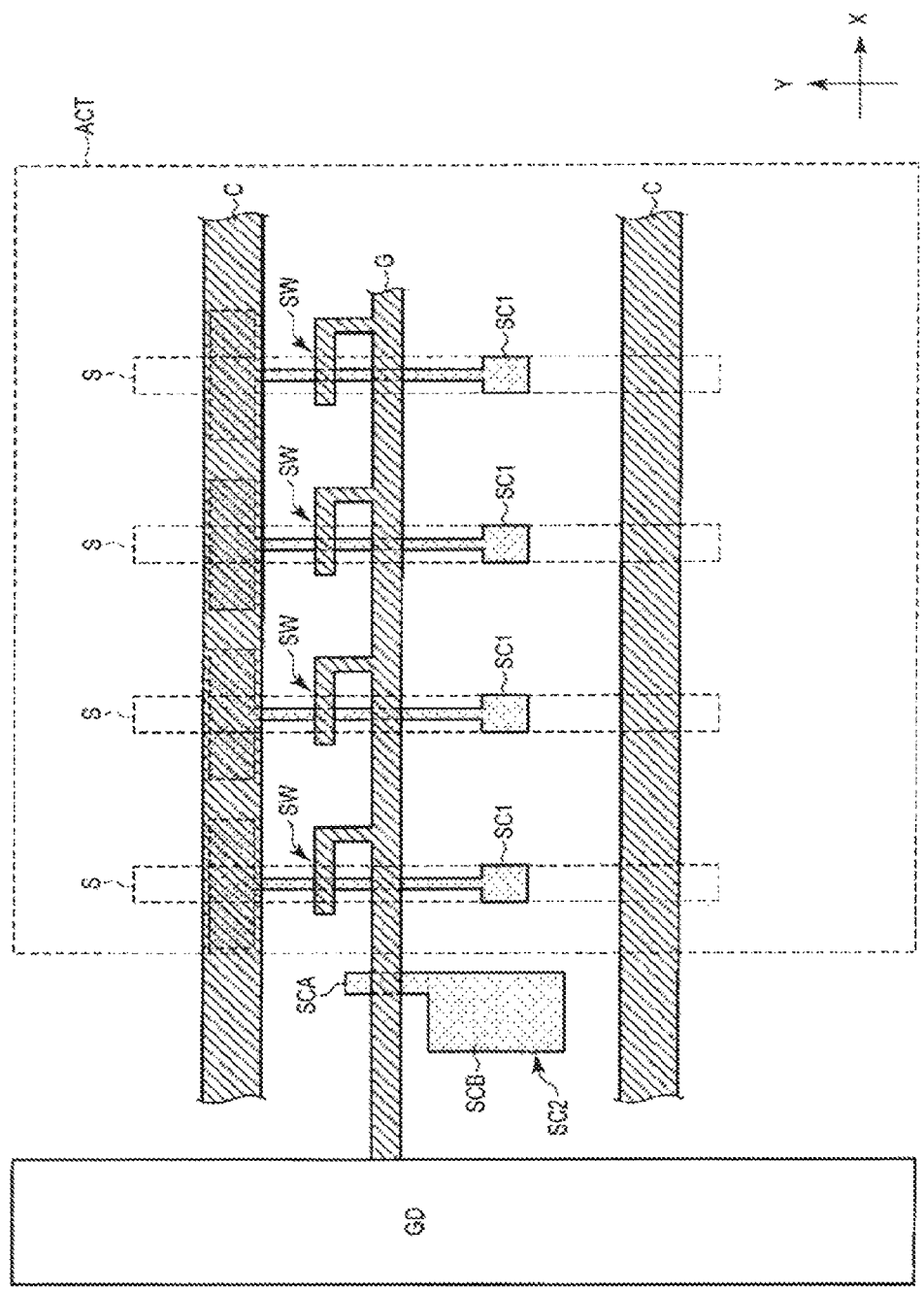
FIG. 8 is a view showing other layout of the gate line and the semiconductor layer SC2 crossing the gate line on the array substrate shown in FIG. 2.

FIG. 8 is a view showing other layout of the gate line G and the semiconductor layer SC2 crossing the gate line G on the array substrate AR shown in FIG. 2.

In the semiconductor layer SC2, the narrow portion SCA which intersects the gate line G extends along the second direction Y. The expanding portion SCB connected with the narrow portion SCA is arranged in a space prolonged in the second direction Y between the gate line G and the auxiliary capacitance line C. The expanding portion SCB has a shape of a rectangle whose length in the second direction Y is larger than the length in the first direction X. The area of the expanding portion SCB is larger than the area of the narrow portion SCA.

Figure 9:
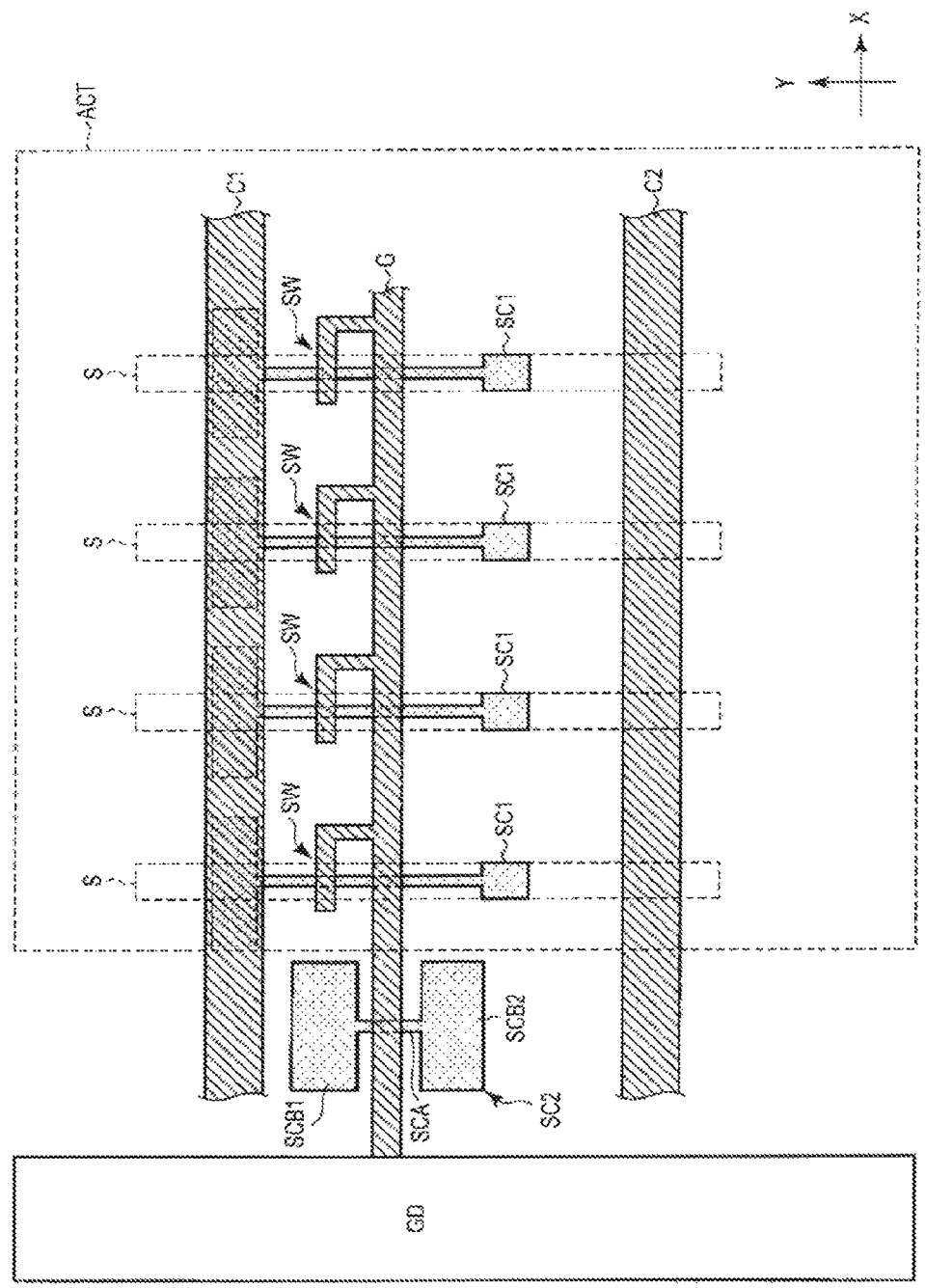
FIG. 9 is a view showing other layout of the gate line and the semiconductor layer SC2 crossing the gate line on the array substrate shown in FIG. 2.

FIG. 9 is a view showing other layout of the gate line G and the semiconductor layer SC2 crossing the gate line G on the array substrate AR shown in FIG. 2.

The semiconductor layer SC2 is equipped with a narrow portion SCA and expanding portions SCB1 and SCB2 on the both sides sandwiching the narrow portion SCA, respectively. The narrow portion SCA extends along the second direction Y, and intersects the gate line G. The expanding portion SCB1 is arranged in a space between the gate line G and the auxiliary capacitance line C1. The expanding portion SCB1 is connected with one end of the narrow portion SCA. The expanding portion SCB2 is arranged in a space between the gate line G and the auxiliary capacitance line C2. The expanding portion SCB2 is connected with the other end of the narrow portion SCA. The expanding portions SCB1 and SCB2 have the shape of a rectangle whose length in the first direction X is larger than the length in the second direction Y. The respective areas of the expanding portions SCB1 and SCB2 are larger than the area of the narrow portion SCA.

Figure 10:
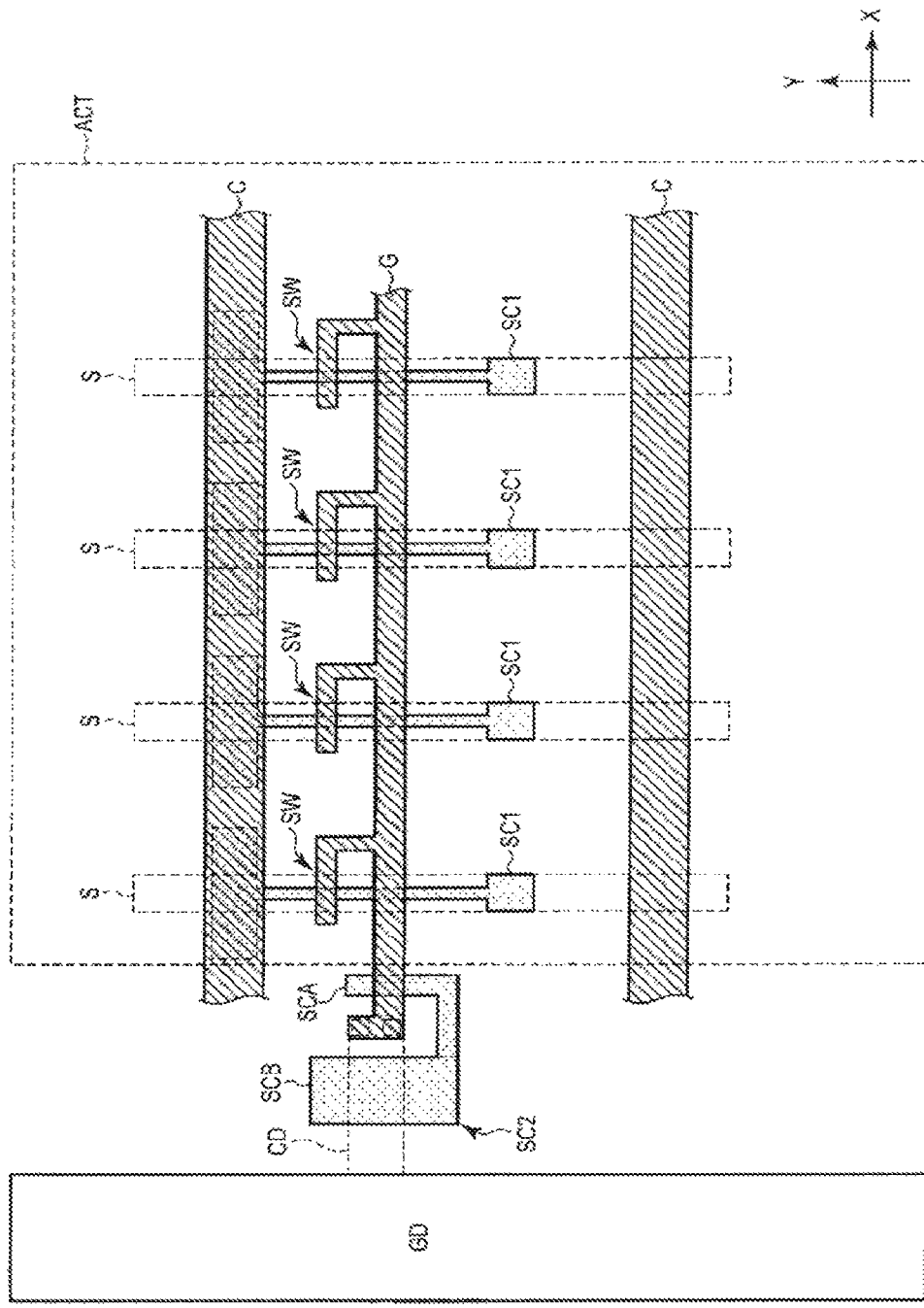
FIG. 10 is a view showing other layout of the gate line and the semiconductor layer SC2 crossing the gate line on the array substrate shown in FIG. 2.

FIG. 10 is a view showing other layout of the gate line G and the semiconductor layer SC2 crossing the gate line G on the array substrate AR shown in FIG. 2.

The embodiment shown in FIG. 10 is different from the embodiment shown in FIG. 3 in that the gate line G is electrically connected to the gate driver GD through an electric conductive layer CD formed of the same layer as the source line while differing in the form from the semiconductor layer SC2.

In the semiconductor layer SC2, the narrow portion SCA includes a first portion extending along the first direction X and a second portion extending along the second direction Y and intersecting the gate line G. That is, the narrow portion SCA is formed in an L-shape. The expanding portion SCB connected with the narrow portion SCA is arranged in a space between the gate line G and the gate driver GD. The expanding portion SCB has the shape of a rectangle whose length in the second direction Y is larger than the length in the first direction X. The area of the expanding portion SCB is larger than the area of the narrow portion SCA.

Even if the semiconductor layer SC2 having any forms described above are applied, the same effect as the embodiment shown in FIG. 3 is acquired.

As explained above, according to the embodiments, the liquid crystal display device which can control the electrostatic defect can be supplied.

While certain embodiments have been described, these embodiments have been presented by way of example only, and are not intended to limit the scope of the inventions. In practice, the structural and method elements can be modified without departing from the spirit of the invention. Various embodiments can be made by properly combining the structural and method elements disclosed in the embodiments. For example, some structural and method elements may be omitted from all the structural and method elements disclosed in the embodiments. Furthermore, the structural and method elements in different embodiments may properly be combined. The accompanying claims and their equivalents are intended to cover such forms or modifications as would fall with the scope of the invention.

The invention claimed is:

1. A display device comprising:
    an insulating substrate;
    a first semiconductor layer located in an active area on the insulating substrate;
    a second semiconductor layer located in a non-display area outside the active area on the insulating substrate;
    a first insulating film covering the first and second semiconductor layers;
    a gate line formed on the first insulating film and overlapping with the first and second semiconductor layers;
    a second insulating film covering the gate line; and
    a source line formed on the second insulating film and connected with the first semiconductor layer,
    wherein the source line is connected with the first semiconductor layer through a first contact hole formed in the first and second insulating films, and
    the second semiconductor layer is in a floating state.

2. The display device according to claim 1, wherein the second semiconductor layer is entirely covered by the first insulating film, and is not connected to a conductive layer located above the first insulating film.

3. The display device according to claim 1, wherein the first and second semiconductor layers are formed of polysilicon.

4. The display device according to claim 1, further comprising:
    a drain electrode formed on the second insulating film;
    a third insulating film covering the source line;
    a common electrode formed on the third insulating film;
    a fourth insulating film covering the common electrode; and
    a pixel electrode formed on the fourth insulating film,
    wherein the pixel electrode is connected with the drain electrode through a second contact hole formed in the third and fourth insulating films, and
    the drain electrode is connected with the first semiconductor layer through a third contact hole formed in the first and second insulating films.

5. The display device according to claim 1, further comprising:
    a first alignment film covering the pixel electrode;
    a second alignment film facing the first alignment film; and
    a liquid crystal layer held between the first and second alignment films.

6. The display device according to claim 1, further comprising a gate drive circuit located in the non-display area,
    wherein the second semiconductor layer is located between the gate drive circuit and the first semiconductor layer.

7. The display device according to claim 1, wherein the second semiconductor layer comprises a first portion overlapping with the gate line and extending in a second direction, which is an extending direction of the source line, and a second portion not overlapping with the gate line and extending in a first direction, which is an extending direction of the gate line.

8. The display device according to claim 7, wherein the second semiconductor layer further comprises a third portion extending in the second direction,
one end of the second portion is connected with the first portion, and
another end of the second portion is connected with the third portion.

9. The display device according to claim 8, wherein a length of the first portion in the second direction differs from a length of the third portion in the second direction.

10. The display device according to claim 8, wherein the third portion overlaps with the gate line, and
the second semiconductor layer crosses the gate line at two portions.

11. The display device according to claim 8, further comprising:
a gate drive circuit located in the non-display area; and
a metallic line located between the gate line and the gate drive circuit and formed on the second insulating film,
wherein the metallic line overlaps with the third portion.

12. The display device according to claim 11, wherein the metallic line connects the gate line and the gate drive circuit.

13. The display device according to claim 12, wherein the metallic line is formed of a same material as the source line.

14. The display device according to claim 1, wherein an area of the first semiconductor layer differs from an area of the second semiconductor layer.

15. The display device according to claim 1, wherein a shape of the first semiconductor layer differs from a shape of the second semiconductor layer.

* * * * *